(12) United States Patent
Wall et al.

(10) Patent No.: US 11,872,511 B2
(45) Date of Patent: *Jan. 16, 2024

(54) FLANGELESS AIR FILTER

(71) Applicant: K&N Engineering, Inc., Riverside, CA (US)

(72) Inventors: Jere James Wall, Helendale, CA (US); Steve Williams, Cherry Valley, CA (US)

(73) Assignee: K&N Engineering, Inc., Riverside, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/967,616

(22) Filed: Oct. 17, 2022

(65) Prior Publication Data

US 2023/0045362 A1 Feb. 9, 2023

Related U.S. Application Data

(63) Continuation of application No. 16/937,435, filed on Jul. 23, 2020, now Pat. No. 11,478,739, which is a continuation of application No. 15/276,502, filed on Sep. 26, 2016, now Pat. No. 10,744,440.

(51) Int. Cl.
*B01D 46/00* (2022.01)
*B01D 46/24* (2006.01)
*B01D 46/52* (2006.01)

(52) U.S. Cl.
CPC ....... *B01D 46/001* (2013.01); *B01D 46/0005* (2013.01); *B01D 2265/06* (2013.01); *B01D 2271/02* (2013.01); *B01D 2279/60* (2013.01)

(58) Field of Classification Search
CPC ........ B01D 27/06; B01D 27/08; B01D 46/00; B01D 45/08; B01D 46/103; B01D 46/12; B01D 46/0087; B01D 2273/10; B01D 46/001; B01D 46/0005; B01D 2279/02; B01D 2271/02; B01D 2265/06
USPC ......... 55/337, 498, 503, 505, 507, 521, 502, 55/509; 95/268, 273
See application file for complete search history.

(56) References Cited

U.S. PATENT DOCUMENTS 10,744,440 B2 * 8/2020 Wall .................... B01D 46/001
11,478,739 B2 * 10/2022 Wall .................... B01D 46/2411

* cited by examiner

*Primary Examiner* — Minh Chau T Pham
(74) *Attorney, Agent, or Firm* — Rutan & Tucker LLP; Hani Z. Sayed

(57) ABSTRACT

An apparatus and method are provided for a flangeless air filter configured to be mounted onto a flat surface within an air intake system of an internal combustion engine. The flangeless air filter is comprised of a cone-shaped filter medium, retained between a base and a cap, that is fabricated to remove contaminants and particulate matter from an intake airstream. The base includes a pliable seal that forms an airtight connection between the flangeless air filter and the flat surface of the air intake system. A mounting bracket and fasteners may be used to attach the base to the flat surface, compressing the seal there between. In some embodiments, the mounting bracket may be incorporated into, and made a part of the base. A cap is disposed on a top of the flangeless air filter and configured to direct the intake airstream around the cap and toward the filter medium.

20 Claims, 2 Drawing Sheets

FLANGELESS AIR FILTER

CROSS-REFERENCE

This application claims the benefit of U.S. patent application Ser. No. 16/937,435 filed on Jul. 23, 2020, now U.S. Pat. No. 11,478,739 and U.S. patent application Ser. No. 15/276,502 filed on Sep. 26, 2016, issued as U.S. Pat. No. 10,744,440 which is hereby incorporated by reference herein in its entirety.

FIELD

The field of the present disclosure generally relates to filtration devices. More particularly, the field of the present disclosure relates to an apparatus and a method for a flangeless air filter configured to be mounted onto a flat surface within an air intake system of an internal combustion engine.

BACKGROUND

An air filter designed to remove particulate matter from an airstream generally is a device comprising fibrous materials. These fibrous materials may remove solid particulates such as dust, pollen, mold, and bacteria from the airstream. Air filters are used in applications where air quality is important, notably in building ventilation systems and with engines.

Air filters may be used in automobiles, trucks, tractors, locomotives, and other vehicles that use internal combustion engines. Air filters may be used with gasoline engines, diesel engines, or other engines that utilize fossil fuels or other combustible substances. Air filters may be used with engines in which combustion is intermittent, such as four-stroke and two-stroke piston engines, as well as other types of engines that take in air continuously so that a combustible substance may be burned. For example, air filters may be used with some gas turbines. Filters may also be used with air compressors or in other devices that take in air.

Filters may be made from pleated paper, foam, cotton, spun fiberglass, or other known filter materials. Generally, the air filters used with internal combustion engines and compressors tend to be comprised of either paper, foam, or cotton filters. Some filters use an oil bath. Air filters for internal combustion engines prevent abrasive particulate matter from entering the cylinders of the engine, where it would cause mechanical wear and oil contamination. In many fuel injected engines, a flat panel pleated paper filter element may be used. This filter is usually placed inside a plastic box connected to the throttle body with ductwork. Vehicles that use carburetors or throttle body fuel injection typically use a cylindrical air filter positioned above the carburetor or throttle body.

SUMMARY

An apparatus and method are provided for a flangeless air filter configured to be mounted onto a flat surface within an air intake system of an internal combustion engine. The flangeless air filter is comprised of a base that includes a seal configured to contact the flat surface and connect an interior of the flangeless air filter with an air intake duct of the internal combustion engine. The seal is comprised of a pliable material amendable to being compressed so as to establish an airtight connection between the base and the flat surface. A cap is fixedly attached to a top of the flangeless air filter and configured to direct an intake airstream into the flangeless air filter. The cap is comprised of a rigid material suitable for withstanding the temperature and pressure within the air intake system. A filter medium is disposed between the base and the cap. The filter medium is configured to remove contaminants and particulate matter from the intake airstream entering the air intake duct. In some embodiments, the filter medium is configured to be treated with a filter oil composition so as to enhance air cleaning properties of the filter medium. A wire support may be incorporated into the filter medium so as to provide additional strength and durability to the flangeless air filter.

In an exemplary embodiment, a flangeless air filter configured to be mounted onto a flat surface within an air intake system of an internal combustion engine comprises a base comprised of a seal that is configured to contact the flat surface and connect an interior of the flangeless air filter with an air intake duct of the internal combustion engine; a cap configured to direct an intake airstream into the flangeless air filter; and a filter medium disposed between the base and the cap, the filter medium being configured to remove contaminants and particulate matter from the intake airstream entering the air intake duct.

In another exemplary embodiment, the cap is comprised of a rigid material suitable for withstanding the temperature and pressure within the air intake system, the cap being fixedly attached to a top of the flangeless air filter. In another exemplary embodiment, the seal is comprised of a pliable material amendable to being compressed so as to establish an airtight connection between the base and the flat surface. In another exemplary embodiment, the base is molded onto and retains a wire support and the filter medium.

In another exemplary embodiment, a mounting bracket is coupled with the base, the mounting bracket being a generally ring-shaped member comprised of an opening that receives a portion of the filter medium adjacent to the base. In another exemplary embodiment, the opening includes a diameter that is suitable to receive the largest diameter of the filter medium, such that the mounting bracket contacts an upper surface of the base. In another exemplary embodiment, a multiplicity of holes are disposed around the circumference of the mounting bracket and configured to receive hardware fasteners so as to couple the base with the flat surface. In another exemplary embodiment, the mounting bracket is incorporated into, and made a part of, the base of the flangeless air filter.

In another exemplary embodiment, the filter medium is configured to be treated with a filter oil composition so as to enhance air cleaning properties of the filter medium. In another exemplary embodiment, a wire support is incorporated into the filter medium so as to provide additional strength and durability to the flangeless air filter. In another exemplary embodiment, the wire support comprises a wire screen positioned on an outer surface and a wire screen positioned on an inner surface of the filter medium. In another exemplary embodiment, the wire screens are comprised of powder-coated aluminum screen wire that is co-pleated along with the filter medium so as to reinforce the flangeless air filter.

In an exemplary embodiment, a method for a flangeless air filter to be mounted onto a flat surface within an air intake system of an internal combustion engine comprises configuring a base that is comprised of a pliable seal to contact the flat surface and connect an interior of the flangeless air filter with an air intake duct of the internal combustion engine; attaching a cap fixedly to a top of the flangeless air filter to direct an intake airstream into the flangeless air filter; and fabricating a filter medium to remove contaminants and particulate matter from the intake airstream entering the air intake duct; retaining the filter medium between the base and the cap; and coupling a mounting bracket with the base, such that the pliable seal may establish an airtight connection between the base and the flat surface.

In another exemplary embodiment, coupling is comprised of disposing holes around the circumference of the mounting bracket to receive hardware fasteners that are suitable to hold the pliable seal in contact with the flat surface. In another exemplary embodiment, coupling further comprises incorporating the mounting bracket into the base.

BRIEF DESCRIPTION OF THE DRAWINGS

The drawings refer to embodiments of the present disclosure in which.

Figure 1:
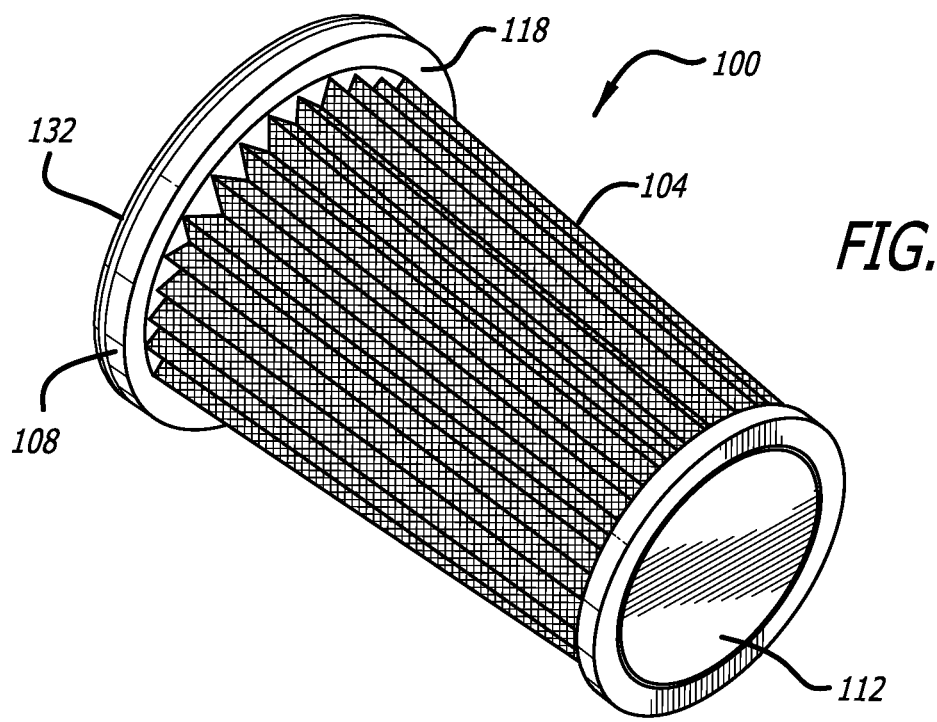
FIG. 1 illustrates an upper perspective view of an exemplary embodiment of a flangeless air filter comprising a cap that encloses a top portion of a filter medium.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first filter medium," may be made. However, the specific numeric reference should not be interpreted as a literal sequential order but rather interpreted that the "first filter medium" is different than a "second filter medium." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes an apparatus and a method for a flangeless air filter configured to be mounted onto a flat surface within an air intake system of an internal combustion engine. The flangeless air filter is comprised of a cone-shaped filter medium that is retained between a base and a cap. The filter medium is fabricated to remove contaminants and particulate matter from an intake airstream. In some embodiments, the filter medium may be configured to be treated with a filter oil composition so as to enhance air cleaning properties of the filter medium. A wire support may be incorporated into the filter medium to provide additional strength and durability to the flangeless air filter. The base is comprised of a pliable seal that forms an airtight connection between the flangeless air filter and the flat surface of the air intake system. A mounting bracket and fasteners may be coupled with the flangeless air filter to attach the base to the flat surface and compress the seal there between. A cap is disposed on a top of the flangeless air filter and configured to direct the intake airstream around the cap and toward the filter medium.

Although embodiments of the invention may be described and illustrated herein in terms of a cone-shaped air filter, it should be understood that embodiments of this invention are not limited to the exact shape illustrated, but rather may include a wide variety of generally enclosed shapes, such as cylindrical, circular, oval, round, curved, conical, or any other closed perimeter shape, that provide a relatively large surface area in a given volume of the filter. Moreover, embodiments as described herein are not limited to use as internal combustion engine filters, but rather may have applicability in other filtration systems in which a large volume of air requires treatment.

FIG. 1 illustrates an upper perspective view of an exemplary embodiment of a flangeless air filter 100 configured for use within an air intake system of an internal combustion engine. It is contemplated that the air intake system may be either of a closed variety or an open intake system. The flangeless air filter 100 is comprised of a filter medium 104 disposed between a base 108 and a cap 112. The flangeless air filter 100 is configured to be coupled with an air intake duct comprising the air intake system, such that an intake airstream is directed around the cap 112 to an exterior of the filter medium 104, drawn through the filter medium 104 into an interior 106 of the flangeless air filter 100, and drawn into the air intake duct to the internal combustion engine. The filter medium 104 is configured to remove contaminants and particulate matter from the intake airstream that is drawn into the air intake duct. The filter medium 104 is a generally cone-shaped member having a diameter that tapers as a function of distance from the base 108 along the filter medium. The cap 112 serves to direct the intake airstream around the top-most portion of the flangeless air filter and into the filter medium 104. It is contemplated that the cap 112 may be comprised of a rigid material suitable for withstanding the temperature and pressure encountered within the air intake system.

Figure 2:
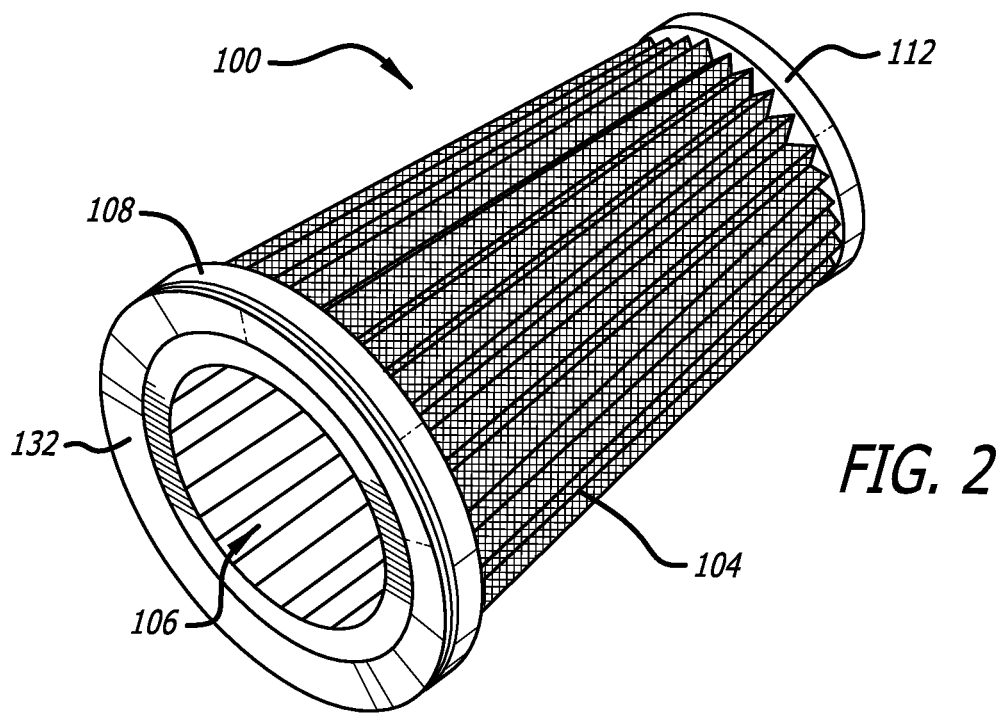
FIG. 2 is a lower perspective view of the flangeless air filter of FIG. 1, illustrating a base configured to be coupled with a flat mounting surface within an air intake system of an internal combustion engine.

In the embodiment of the flangeless air filter 100 illustrated in FIGS. 1-2, the base 108 has a diameter that is greater than the diameter of the cap 112. In some embodiments, however, the diameter of the base 108 may be substantially equal to the diameter of the cap 108. It should be understood that the flangeless air filter 100 of the present disclosure is not limited to the exact shape illustrated in FIGS. 1-2, but rather may include a wide variety of generally cylindrical, circular, oval, round, curved, or other closed perimeter shapes, that provide a relatively large surface area of the filter medium 104. Further, it will be appreciated that the specific configuration of the flangeless air filter 100 depends upon the particular make and model of the engine for which the flangeless air filter is to be utilized, and thus a wide variety of heights and diameters of the filter medium 104 may be incorporated into the flangeless air filter 100 without straying beyond the scope of the present disclosure.

The base 108 generally is configured to support the flangeless air filter 100 and provide an interface between the interior 106 of the flangeless air filter and the air intake duct of the internal combustion engine. Any of a variety of fasteners (not shown) may be used to affix the filter medium 104 to the base 108. In some embodiments, the base 108 may be molded to a wire support of the filter medium 104. In some embodiments, the base 108 may be crimped such that it folds onto and retains the wire support and the filter medium 104 of the flangeless air filter 100. It will be appreciated by those skilled in the art that affixing the filter medium 104 to the base 108 generally renders the filter medium 104 irremovable from the flangeless air filter 100. As such, it is contemplated that a practitioner may periodically clean the flangeless air filter 100, as discussed herein below.

Figure 3:
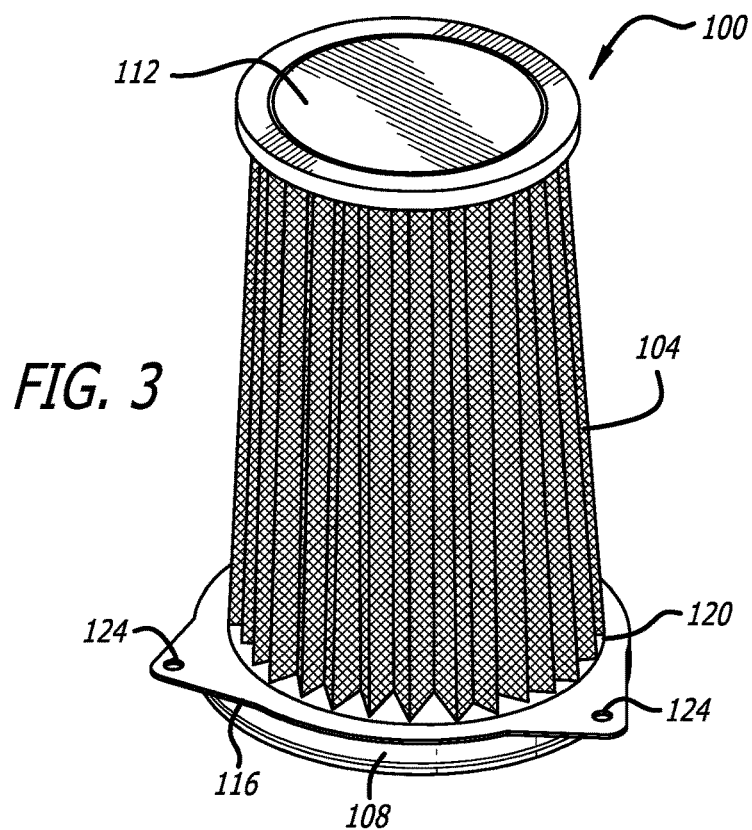
FIG. 3 illustrates an upper perspective view of an exemplary embodiment of a flangeless air filter coupled with a mounting bracket for fastening the flangeless air filter to an air intake system of an internal combustion engine.
Figure 4:
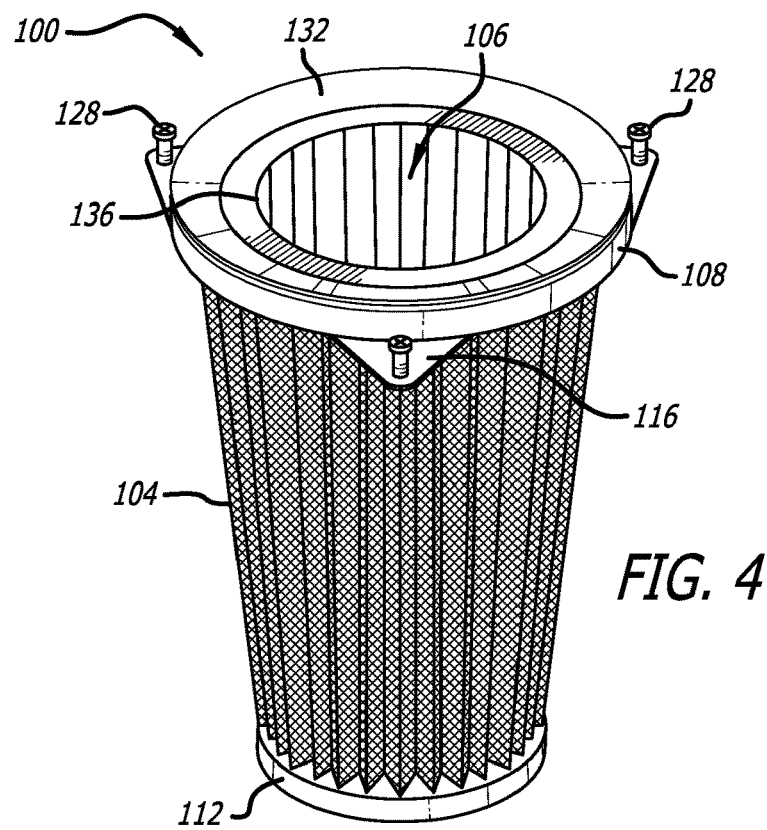
FIG. 4 illustrates a lower perspective view of the flangeless air filter of FIG. 3. with exemplary hardware fasteners engaged with holes of the mounting bracket.

In an exemplary embodiment illustrated in FIGS. 3-4, a mounting bracket 116 is coupled with the base 108. The mounting bracket 116 is a generally ring-shaped member comprised of an opening 120 that receives a portion of the filter medium 104 adjacent to the base 108. As such, the opening 120 includes a diameter that is suitable to receive the largest diameter of the filter medium 104, such that the mounting bracket 116 is placed into contact with an upper surface 118 of the base 108, as best shown in FIG. 1. A multiplicity of holes 124 may be disposed around the circumference of the mounting bracket 116 and configured to couple the base 108 with the air intake of the engine. In the illustrated embodiment of FIGS. 3-4, three of the holes 124 are disposed uniformly around the circumference of the mounting bracket 116 and are threaded so as to receive suitable hardware fasteners 128. The mounting bracket 116 may be a separate component that is configured to cooperate with the flangeless air filter 100, as shown in FIGS. 3-4, or the mounting bracket 116 may be incorporated directly into the base 108 of the flangeless air filter 100. Further, in some embodiments, the positions of the holes 124 on the mounting bracket 116 may be varied from those shown in FIGS. 3-4, and may depend upon the make and model, as well as the specific configuration of the engine, for which the flangeless air filter 100 is intended to be used.

As will be appreciated, the holes 124 and the hardware fasteners 128 are particularly suitable for attaching the base 108 to a flat surface, such as an interior mounting surface of an air intake system of the internal combustion engine. A bottom of the base 108 preferably includes a seal 132 that is disposed circumferentially around an opening 136 to the interior 106 of the flangeless air filter 100. The seal 132 preferably is comprised of a pliable material that is amenable to being compressed between base 108 and the interior mounting surface of the air intake system. It is contemplated that the interior mounting surface includes holes through which the fasteners 128 may be extended before being threadably engaged with the holes 124. When the fasteners 128 are then tightened into the holes 124, the seal 132 establishes an airtight connection between the base 108 and the interior mounting surface, thereby forcing the airstream to pass through the filter medium 104 before entering the engine. It should be understood, however, that the flangeless air filter 100 is not to be limited to being used with the mounting bracket 116, the holes 124, or the fasteners 128, but rather the flangeless air filter 100 may be coupled with a wide variety of air intake systems by way of any of various mechanical fastening means, without deviating beyond the spirit and scope of the present disclosure.

The cap 112 may be affixed to the filter medium 104 by way of any of a variety of fasteners (not shown), or suitable adhesives. In some embodiments, the cap 112 may be molded onto the above-mentioned wire support and the filter medium 104. In some embodiments, the cap 112 may be crimped around its peripheral edge such that it folds onto and retains the wire support and the filter medium 104 of the flangeless air filter 100. Any of various fastening means may be practiced for attaching the filter medium 104 and the wire support to the cap 112, without limitation. Further, the cap 112 preferably is comprised of a material that is sufficiently hard to retain the filter medium 104 in a desired configuration and support the flangeless air filter 100 when coupled to the air intake system of the engine.

In general, the filter medium 104 provides a surface area through which to pass the intake airstream and entrap particulates and other contaminates flowing with the intake airstream. The filter medium 104 may be comprised of paper, foam, cotton, spun fiberglass, or other known filter materials, woven or non-woven materials, synthetic or natural, or any combination thereof. The filter medium 104 may be pleated, or otherwise shaped, or contoured so as to increase the surface area for passing the intake airstream to be cleaned. The length of the filter medium 104 in the circumferential direction may be longer than the circular circumference of the flangeless air filter 100 generally, such that the surface area of the filter medium 104 is greater than the profile surface area of the flangeless air filter.

As mentioned above, some embodiments of the flangeless air filter 100 may be comprised of a wire support that is incorporated into the filter medium 104. Incorporating the wire support into the filter medium 104 provides additional strength and durability to the flangeless air filter 100. For example, the filter medium 104 may be positioned between the wire support and one or more layers of a reinforcing material. The wire support may be comprised of wire screens positioned on an outer surface and an inner surface of the filter medium 104. In some embodiments, the filter medium 104 may be comprised of 4 to 6 layers of cotton gauze that are sandwiched between two epoxy-coated aluminum wire screens. It is contemplated that the wire screens may be co-pleated along with the filter medium 104 so as to reinforce the flangeless air filter 100.

Moreover, the cotton gauze may be advantageously treated with a suitably formulated filter oil composition that causes tackiness throughout microscopic strands comprising the filter medium 104. The nature of the cotton allows high volumes of airflow, and when combined with the tackiness of the filter oil composition creates a powerful filtering medium which ensures a high degree of air filtration. Further details about components comprising the filter medium 104, as well as details about the filter oil composition, are disclosed in U.S. patent application Ser. No. 14/181,678, entitled "Air Box With Integrated Filter Media," filed on Feb. 16, 2014, and U.S. patent application Ser. No. 14/701,163, entitled "Filter Oil Formulation," filed on Apr. 30, 2015, the entirety of each of which is incorporated herein by reference.

It is contemplated that a practitioner of the flangeless air filter 100 may periodically clean the filter medium 104 rather than discarding the entire flangeless air filter, as is done with conventional air filters. In one embodiment, a cleaning method may be comprised of accessing the flangeless air filter 100 within the air intake system and then removing the fasteners 128 from the holes 124 to loosen and release the mounting bracket 116. The flangeless air filter 100 may then be removed from the air intake system. The practitioner may clean the flangeless air filter 100 by inserting a water hose through the opening 136 into the interior 106 and then spraying water so as to flush contaminants from the filter medium 104. In some embodiments, the method for cleaning the flangeless air filter 100 may be comprised of utilizing a high pressure air hose in lieu of the water hose. In some embodiments, the method for cleaning the flangeless air filter 100 may be comprised of spraying water onto the exterior of the filter medium 104, such that the water and contaminants are flushed directly from the exterior of the filter medium 104. It is contemplated that any water and contaminants that are forced through the filter medium 104 may exit the interior 106 through the opening 136. Other cleaning methods will be apparent to those skilled in the art without deviating from the spirit and scope of the present disclosure.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. An air filter for an internal combustion engine, comprising:
    a base for coupling with an air intake system of the internal combustion engine;
    a mounting bracket for fastening the base to the air intake system;
    a seal for establishing an airtight connection between the base and the air intake system;
    a cap enclosing an interior cavity of the air filter; and
    a filter medium disposed between the base and the cap.
2. The air filter of claim 1, wherein the filter medium is configured to be periodically cleaned by flushing contaminants from the filter medium.
3. The air filter of claim 1, further comprising a filter oil composition that is adapted to enhance air filtering properties of the filter medium.
4. The air filter of claim 1, wherein the mounting bracket includes a plurality of protrusions.
5. The air filter of claim 1, wherein the mounting bracket is incorporated directly into the base.
6. The air filter of claim 1, wherein a hole is disposed in each of the plurality of protrusions.
7. The air filter of claim 6, wherein holes are disposed around a circumference of the mounting bracket and configured to couple the base with the air intake system.
8. The air filter of claim 7, wherein three of the holes are disposed uniformly around the circumference and are threaded so as to receive suitable hardware fasteners.
9. The air filter of claim 8, wherein the holes and the hardware fasteners are configured for attaching the base to a flat surface comprising the air intake system.
10. The air filter of claim 9, wherein the holes are configured to threadably receive the hardware fasteners for establishing the airtight connection.
11. A method for an air filter for an internal combustion engine, comprising:
    configuring a base to be coupled with an air intake system of the internal combustion engine;
    forming a mounting bracket for fastening the base to the air intake system;
    adapting a seal for establishing an airtight connection between the base and the air intake system;
    configuring a cap for enclosing an interior cavity of the air filter; and
    disposing a filter medium between the base and the cap.
12. The method of claim 11, wherein disposing the filter medium includes configuring the filter medium to be periodically cleaned.
13. The method of claim 12, wherein configuring the filter medium to receive a filter oil composition that is adapted to enhance air filtering properties of the filter medium.
14. The method of claim 11, wherein forming the mounting bracket includes incorporating the mounting bracket directly into the base.
15. The method of claim 11, wherein forming the mounting bracket includes forming a plurality of protrusions around a circumference of the mounting bracket.
16. The method of claim 15, wherein forming the plurality of protrusion includes forming a hole in each of the plurality of protrusions.
17. The method of claim 16, wherein forming the holes includes configuring the holes to couple the base with the air intake system.
18. The method of claim 17, wherein configuring the holes includes disposing three holes uniformly around the circumference and threading the holes to receive suitable hardware fasteners.
19. The method of claim 11, wherein configuring the cap includes forming the cap of a rigid material that is suitable for retaining the filter medium in a desired configuration the air filter is coupled to the air intake system.
20. The method of claim 11, wherein adapting the seal includes obtaining a material suitable for forming the airtight connection between the base and the air intake system.

* * * * *